June 30, 1970 A. QUENOT 3,517,780

BRAKING MECHANISM FOR LINEAR MEASURING INSTRUMENTS

Filed May 21, 1968

United States Patent Office 3,517,780
Patented June 30, 1970

3,517,780
BRAKING MECHANISM FOR LINEAR
MEASURING INSTRUMENTS
André Quenot, Besancon, France, assignor to Quenot &
Cie s.a.r.l., Besancon, France, a company of France
Filed May 21, 1968, Ser. No. 730,808
Claims priority, application France, Jan. 19, 1968,
136,603
Int. Cl. F16d 63/00; B60c 13/04
U.S. Cl. 188—83                                    4 Claims

ABSTRACT OF THE DISCLOSURE

This invention relates to an improved braking mechanism for linear measuring instruments which have a wound measuring tape, the element transmitting the braking force of a spring bears on the tape measure casing against a winding drum and is made of a self-lubricating synthetic material. The spring itself can be made of the same material.

---

This invention is concerned with a braking mechanism for linear measuring instruments having a wound measuring tape.

It is presently known to brake the winding drum of a linear measuring instrument having a tape, for example a decameter, by means of a spring mounted around the shaft of the drum, and which, bearing against one face of the instrument casing, forces the drum to rub against the casing to accomplish the desired braking.

According to known devices, the spring comprises a curved circular disc divided into a number of folds by radial slots. A central circular opening allows passage of the shaft. These elastic folds bear against an outer surface of the casing, while the central part of the spring bears against a collet of a metallic socket freely mounted on a shaft of the drum. This socket transmits the force of the spring to the shaft of the drum, causing rubbing of the lateral surface of the drum against the inner surface or the outer corresponding surface of the casing.

These devices have a certain number of drawbacks. In effect, the socket transmits all the force of the spring by its shoulder which bears against a corresponding shoulder of the drum's shaft. The contacting surface, between the shoulder of the shaft and the shoulder of the socket is small and therefore the pressure thereon is high. As a result, the rotation of the shaft risks causing rotation of the socket, particularly where the contacting surfaces are slightly altered by humidity, dust or rust.

Rotation of the socket necessarily causes its rapid wear at its surface portion which is in contact with the spring and also causes wear of the spring. Moreover, it is difficult to make the socket and the spring in a single metallic piece and additionally the spring would tend to itself be turned.

Consequently, the invention proposes to provide an improved braking device for linear measuring instruments having a wound tape, which makes it possible to eliminate these drawbacks.

To this effect, the invention is concerned with an improved braking device for linear measuring instruments which have wound tape, characterized in that the socket transmitting the action of the spring bears on the casing upon the shaft of the winding drum and is made of a self-lubricating synthetic material. The spring may also be made of the same self-lubricating material if desired.

Figure 1:
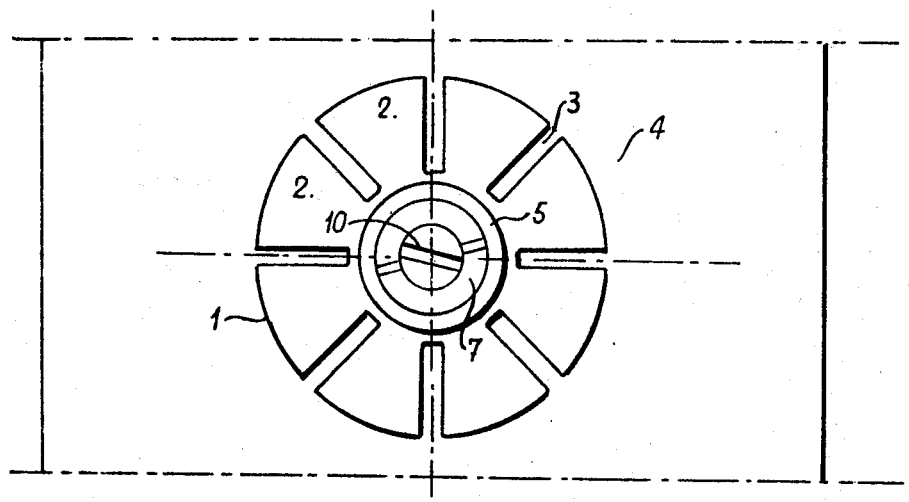
Figure 2:
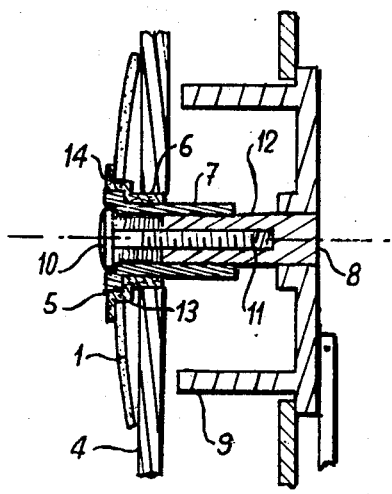
Figure 3:
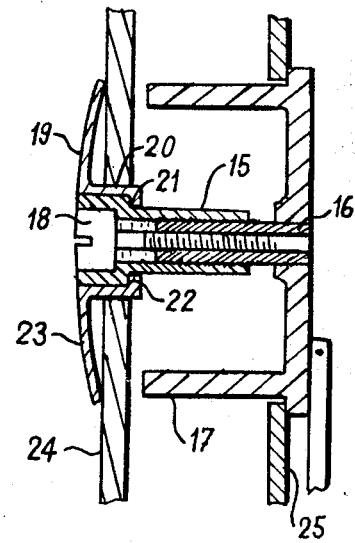

The invention will be better understood by referring to the following description made by way of a non-limiting example, as well as to the accompanying drawing in which:

FIG. 1 shows a front view of the device according to the invention.
FIG. 2 shows a cross sectional view of this device.
FIG. 3 shows a cross sectional view of a modified embodiment of the invention.

The device, according to the invention as viewed in FIGS. 1 and 2, comprises a curved circular metallic disc spring 1, divided in known manner into a certain number of sections 2, by radial slots 3. These sections bear against the outside surface 4 of the instrument casing.

Spring 1 bears by its central part against an edge 5 of a socket 6 freely mounted on a cylindrical sleeve 7, preferably metallic. The sleeve 7 is screwed on shaft 8 which is fixed to a brake drum 9. A screw 10 is screwed inside the shaft 8 provided for this purpose, in a known manner, with an interior thread 11 having a pitch opposite that of thread 12, on which is screwed socket 7. This screw 10 prevents accidental rotation of socket 7 relative to the shaft 8.

Socket 6 is made of a synthetic self-lubricating material, for example of, acetal resin ("Delrin") or polyamid ("Nylon") or other. It is fixed against translational movement by the shoulder 13 of the sleeve 7 between which bears its own shoulder 14.

In the embodiment in FIG. 3 is shown a metallic socket 15 screwed on a shaft 16 which is fixed to a drum 17. A screw 18, of the opposite pitch, is freely screwed inside the shaft 16. On a socket 15 is mounted a part 19 of a self-lubricating synthetic material. The part 19 comprises a cylindrical body 20 provided with a shoulder 21 which bears against a mating shoulder 22 of the sleeve 15 and an elastic part 23 which ensures the rubbing of a braking surface of the drum 17 against a complementary braking surface on wall 25. The elastic part 23 can be divided into sections, as spring 1, or can assume the shape of a cupola.

Sleeve 6, or part 19, can be fixed against rotation relative to the wall of the casing by any suitable means. For example, by means of a flat section made on the outside of the sleeve cooperating with a flat section in the central opening of the casing.

Although the invention has been described with respect to a particular embodiment thereof, it is understood that the same is in no way limited thereto and that there can be various modifications of shape and of material without thereby departing from the scope or framework of the invention.

What is claimed is:
1. An improved braking mechanism comprising: a rotatable brake drum having a braking surface thereon; mounting means including a mounting shaft connected to said brake drum for rotatably mounting said brake drum, and a first sleeve fixedly mounted on said mounting shaft; a complementary braking surface disposed adjacent said first-mentioned braking surface; a disc spring having an arcuate cross-section continuously biasing said first-mentioned braking surface in a given direction against said complementary braking surface to maintain said brake drum in any given angular position; and said mounting means further including a self-lubricating second sleeve positioned on the first sleeve mounting said disc spring circumferentially thereof for rotation relative to said first sleeve to effectively maintain said disc spring stationary during rotation of said brake drum to minimize wear of said disc spring.

2. A device according to claim 1, wherein said mounting shaft has means defining a longitudinally extending bore therein, said bore being threaded in a first direction to receive a complementary threaded screw; said mounting shaft also having external threads on its periphery, said external threads being threaded in a direction opposite to said first direction; and wherein said first sleeve has threads complementary to said external threads and is screwed on said mounting shaft; and a screw havings threads complementary to the bore threads screwed into said bore, said screw having a head which overlies an end portion of said first sleeve when screwed into said bore; whereby accidental rotation of said first sleeve relative to said mounting shaft is prevented by said screw.

3. A device according to claim 3, wherein said self-lubricating sleeve and said first sleeve each have mating shoulders which cooperate together to limit translational movement of said self-lubricating sleeve in a direction opposite to said given direction.

4. A device according to claim 3, wherein said disc spring and said self-lubricating sleeve comprise one, integral member.

References Cited
UNITED STATES PATENTS

| | | | |
|---|---|---|---|
| 286,161 | 10/1883 | Wortley | 242—75.4 |
| 1,588,039 | 6/1926 | Monosmith | 188—83 |
| 2,608,451 | 8/1952 | Pierce | 308—184 |
| 3,313,579 | 4/1967 | Seidenfeld | 308—240 |
| 3,380,791 | 4/1968 | Peck | 308—240 |

GEORGE E. A. HALVOSA, Primary Examiner

U.S. Cl. X.R.

188—84, 166; 242—75.4, 147